US010235896B2

United States Patent
Stewart

(10) Patent No.: US 10,235,896 B2
(45) Date of Patent: Mar. 19, 2019

(54) INTERACTIVE STORY TELLING METHOD TO UNVEIL A STORY LIKE SOLVING A CROSSWORD PUZZLE

(71) Applicant: Michael Sean Stewart, Santa Monica, CA (US)

(72) Inventor: Michael Sean Stewart, Santa Monica, CA (US)

(*) Notice: Subject to any disclaimer, the term of this patent is extended or adjusted under 35 U.S.C. 154(b) by 177 days.

(21) Appl. No.: 15/287,634

(22) Filed: Oct. 6, 2016

(65) Prior Publication Data
US 2017/0098381 A1    Apr. 6, 2017

Related U.S. Application Data

(60) Provisional application No. 62/237,613, filed on Oct. 6, 2015.

(51) Int. Cl.
| | | |
|---|---|---|
| *G09B 25/00* | (2006.01) | |
| *G09B 7/04* | (2006.01) | |
| *A63F 3/04* | (2006.01) | |
| *G09B 19/00* | (2006.01) | |
| *H04B 1/3827* | (2015.01) | |
| *A63F 3/00* | (2006.01) | |

(52) U.S. Cl.
CPC .............. *G09B 7/04* (2013.01); *A63F 3/0421* (2013.01); *G09B 19/00* (2013.01); *A63F 2003/00996* (2013.01); *A63F 2003/0428* (2013.01); *H04B 1/3833* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,098,980 A | * | 8/2000 | Ramage | A63F 9/1044 |
| | | | | 273/157 R |
| 2003/0162160 A1 | * | 8/2003 | Horchler | A63F 9/10 |
| | | | | 434/406 |
| 2007/0087798 A1 | * | 4/2007 | McGucken | A63F 13/10 |
| | | | | 463/1 |
| 2012/0196661 A1 | * | 8/2012 | Snoddy | A63F 9/0612 |
| | | | | 463/9 |
| 2014/0019865 A1 | * | 1/2014 | Shah | G06F 3/0484 |
| | | | | 715/731 |
| 2014/0040712 A1 | * | 2/2014 | Chang | G06F 17/212 |
| | | | | 715/202 |

* cited by examiner

*Primary Examiner* — Masud Ahmed
(74) *Attorney, Agent, or Firm* — Treasure IP Group, LLC

(57) ABSTRACT

A method disclosed herein provides close interaction and participation for a user while a story line is unveiled. At least part of the story is present in a grid, and the story line is discovered by a user in a manner similar to solving a crossword puzzle.

18 Claims, 13 Drawing Sheets

INTERACTIVE STORY TELLING METHOD TO UNVEIL A STORY LIKE SOLVING A CROSSWORD PUZZLE

CROSS REFERENCE TO RELATED APPLICATION(S)

The present invention takes priority of a provisional application, entitled "An interactive story telling method to unveil a story analogous to solving a crossword puzzle," filed on Oct. 6, 2015. The provisional application is referenced herein in its entirety.

TECHNICAL FIELD

The present invention relates generally to methods and apparatuses for an entertainment and/or education method using a personal computing device. More particularly the present invention relates to a method to uncover a story like solving a crossword puzzle.

BACKGROUND OF THE INVENTION

Traditional story-based entertainment media, such as books, television shows and movies offer a show in a linear fashion which the audience is expected only to passively observe. But the natural use mode for computing devices such as personal computers or smart phones is interactive: I type, I text, I talk, I swipe. Touch sensitive screens have created a world in which computing devices easily and naturally take input from users ranging from two years old to ninety-nine.

This results in a tension between the desire to create and consume good stories, and the user's desire for agency and participation in entertainment on responsive personal computing devices. Combining story with interaction has been an ongoing goal from the earliest days of computer entertainment, from text adventures such as Zork to contemporary AAA games like Call of Duty or Destiny. These have generally given players the ability to change events in the narrative, either by selecting between branching narratives (in a Choose Your Own Adventure model) or by specifying a general story order interspersed with high-agency game play (the "combat punctuated with non-interactive cut scenes" model of the typical video game.)

The individual computing devices having touch sensitive screens can take inputs from viewers ranging from two years old to 99 years old. This offers a very simple and effective way for readers to interact with the content of the story. Therefore a more innovative story telling method to more actively involve a reader or an audience is needed.

Branching techniques have been used to diverge story lines; they invite a reader to participate and to let a reader influence the eventual outcome of the overall story. For example, U.S. Pat. No. 7,784,069 discloses a method to use divergent story lines in a movie though introducing many logical branches in the movie action and plot, and then which logical branch is selected to be shown next is decided by preferences of the audience. The preferences of the audience are characterized by votes that are collected prior to the showing of the next logical branch. The privileges of voting for particular storyline branches, or rights to influence the direction taken of the storyline are provided for purchase. One shortcoming of this method is that the ability to influence the outcome of the movie is closely related to the purchasing power of the individual reader or audience, which limits this method to be readily adaptable to everybody. Additionally, engagement of the user is only limited to voting power.

The present invention takes a very different approach. The story itself is fixed, but the user is given tremendous agency in the act of assembling it. This allows the story to preserve the best elements of storytelling, but the user's experience of it is based on her individual intelligent guesses throughout. In this sense the present invention feels less like a video game, and more like more casual puzzle games. As in a crossword, each correct guess gives the user more clues to fill in subsequent pieces of the puzzle. As in a jigsaw puzzle, the final picture is determined from the start, but the entertainment activity lies in the user actively assembling it.

SUMMARY OF THE INVENTION

The present invention provides an improved interactive story telling method, which gives users a non-linear discovery experience of a linear story.

A primary object of the present invention is to provide a more intelligent way to involve a reader or a player to participate in the narrative process of a story.

Another object of the present invention is to enhance the discovery experience of a story, particularly the user's depth of engagement with the story.

Still another object of the present invention is to allow a user the most participation in the development of the story or to give the user most control of the formation of the story without changing the beginning and ending of the story.

Yet another object of the present invention is to bring in aspects of social interaction with multiple players.

The present invention, in one aspect, provides an improved computer executable system, comprising a computer executable program and touch sensitive user interface. The computer executable program comprises a linear story, wherein the content of the story is divided into multiple story pieces, among said multiple story pieces there is only one as the beginning piece and one is the end piece, and each story piece is associated with an individual key descriptor library. The touch sensitive user interface is configured to allow a user to input guesses in a word format to navigate through the story pieces. The computer executable system of story telling, further comprises a discovery sequence of the story pieces, which is determined by comparing the guesses from the user with the key descriptor library of the different story pieces.

In another aspect of the present invention, an improved method to tell a story is disclosed. A linear story is provided to a user;
dividing the linear story into multiple linked story pieces, wherein each story piece is placed in a cell, associating each cell with a library of key descriptors;
uncovering a first initial portion of the story pieces;
covering a second initial portion of the story pieces;
inviting the user to guess one word in order to uncover more of the linear story;
revealing more of the story pieces by comparing the one word the user enters with the library of the key descriptors associated with each cell;
wherein the user does not change the story pieces.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EXAMPLE EMBODIMENTS

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents that can be included within the spirit and scope of the described embodiments as defined by the appended claims.

Many interactive storytelling methods are available in the market to date. For example, in an adventure book or a video game, the interaction between the story and a user allows a user to control or influence the outcome of the story. In another words, the narrative of the story can be changed by the user.

In contrast, the present invention discloses a different method of story telling, wherein the story itself is fixed and cannot be changed, but the user is given a great control of the discovery process in the story. For example, a user can start in chapter 3, jump to chapter 6, find partial information in chapter 4 and them leap back to the very beginning. But the user cannot do it freely as is possible with an open book. The user must overcome requests from the computer-executable program for keywords with or without clues provided. The user studies the revealed parts of the story and tries to guess a word that might uncover more of the story. This guess is then entered into the computer executable program, which tests against the library of keywords to see if a new panel of the story is then revealed.

In other words, the user is reconstructing a narrative of the story as an archaeologist might try to figure out ancient history from evidence such as pottery and pyramids.

In accordance with the aspects of the present invention, the word "story" means an arrangement of a series of actions and plots. It can either be complete fiction from beginning to end, having no relationship to other pieces in a program or it can be a piece of fiction that narrates a chain of related events, but it further relates to other pieces in the program. In the present invention, a story or program are merely descriptions of a series of related events in a narrative format, that do not limit the presentation format of the story. The presentation format can be video, a comic book, or a novel.

In accordance with the aspects of the present invention, the user is the one who navigates through the story. It can be a player for a game, a reader of a book, or an audience for a video or movie.

Figure 1:
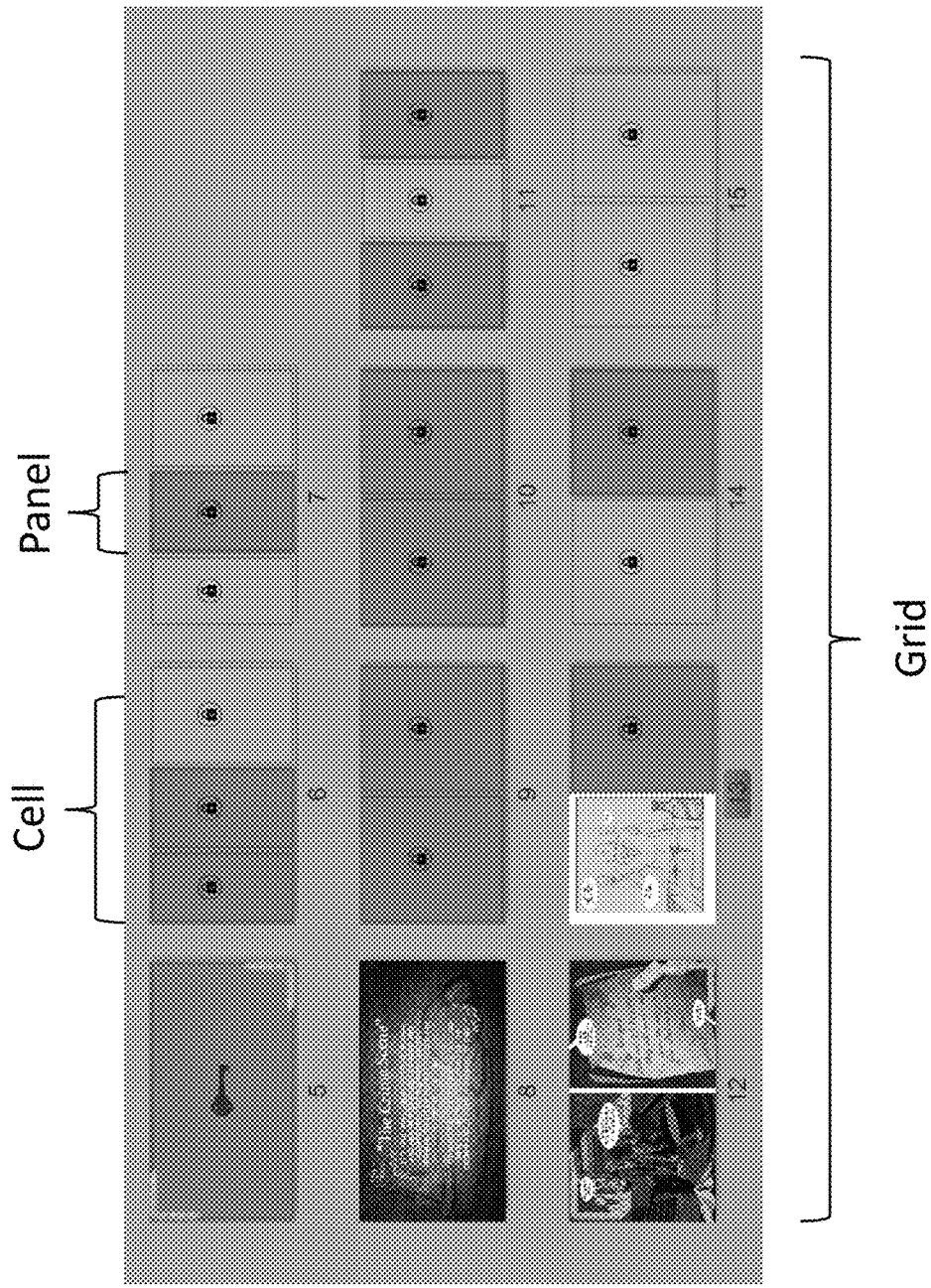
FIG. 1 is an illustration of an exemplary embodiment of the present invention when it is displayed on a touch screen, wherein the story is divided into story pieces and arranged into panels and further grouped into cells, in accordance with the aspects with the present invention.
Figure 2:
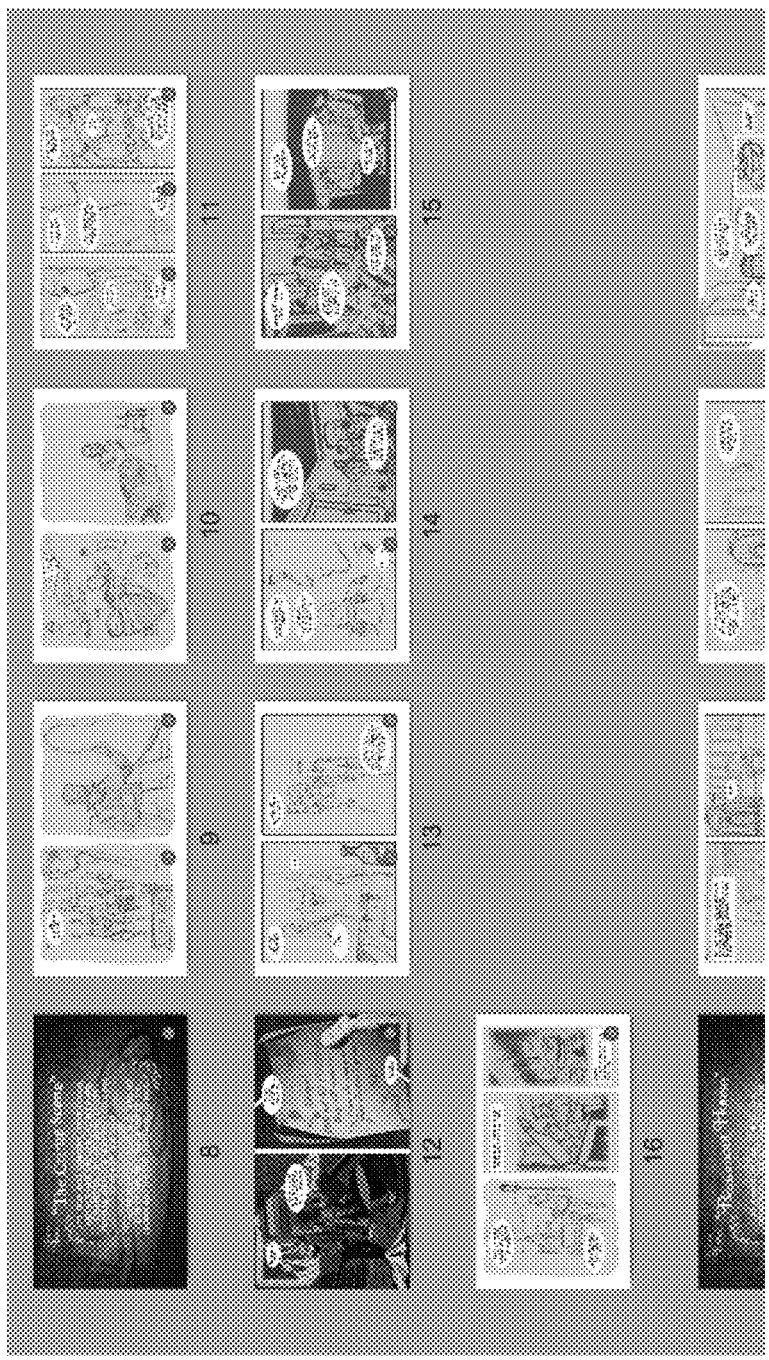
FIG. 2 is a schematic illustration of a graphic novel, laid out in a regular linear fashion (from beginning to end).

In accordance with the aspects of the present invention, the story is a linear story, which can be divided into a series of story pieces. Among all the story pieces, in one example, some story pieces happen sequentially. In another example, some story pieces do not have to happen sequentially. Each story piece is placed in a panel. For example, as shown in FIGS. 1 and 2, a story piece is enclosed in a panel in a graphical format, including images and words. Among all the pieces of the story, based on the content of the story pieces, some story pieces are further grouped together to become a cell. In one example, two panels are grouped together in to one cell. In another example, three panels are grouped together in one cell. The cells are placed with distinctive and regular spaces in between. Referring to FIG. 1, the cells of the story are placed in a grid, having rows and columns, like a cross-word puzzle. In one example, story pieces of in the grid are placed so that the contents are in a chronological order. In another example, story pieces of the grid are placed in another logical order. In another example, the story pieces are placed not in a specific order with respect to the content.

Figure 3:
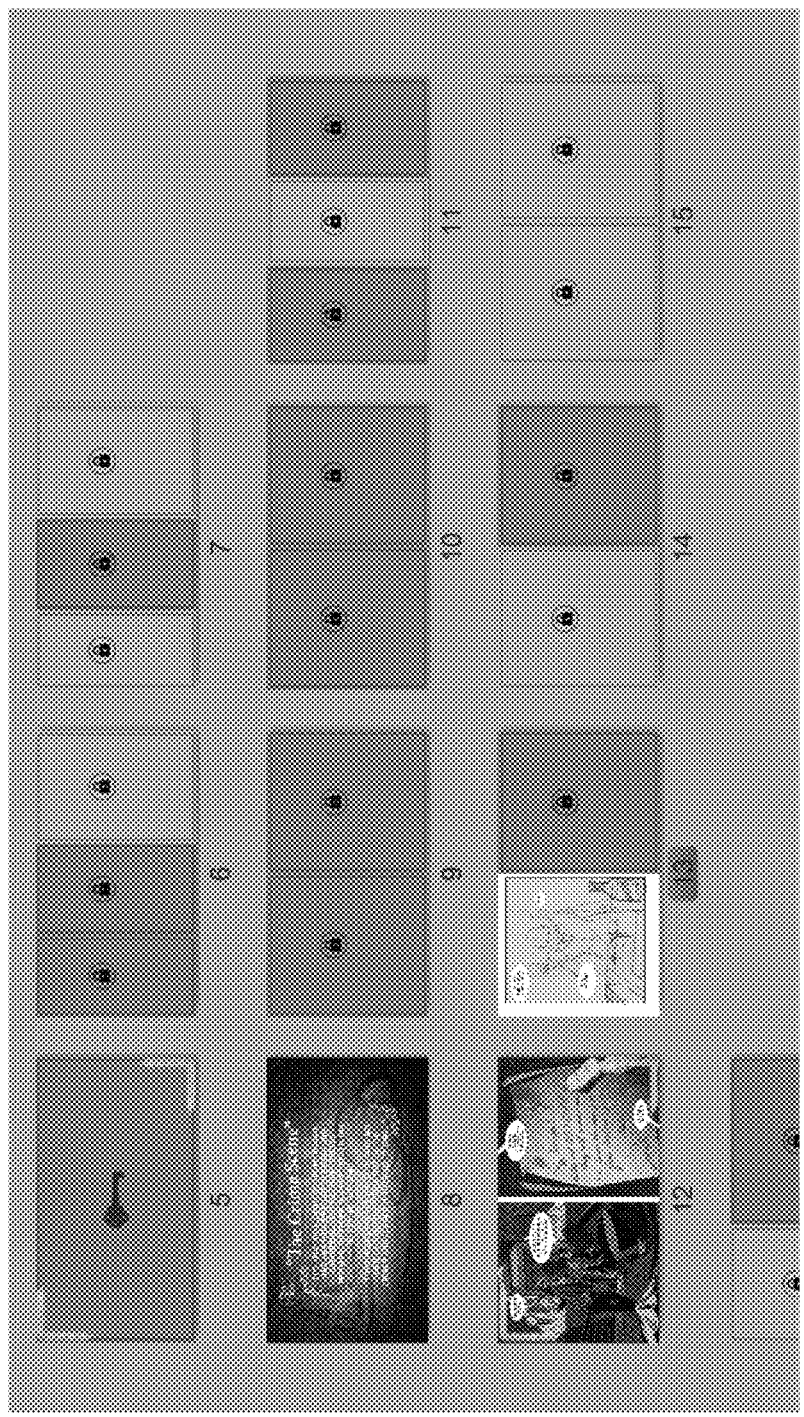
FIG. 3 is an illustration of an exemplary embodiment of the present invention when a user first approaches the story, most of panels are concealed.

In accordance with the aspects of the present invention, the story pieces enclosed in the panels can be displayed on the touch screen in different views and layouts. In one example, when a user is first introduced to the story pieces, a grid view may be presented. Exemplar grid views are shown in FIGS. 1 and 2. In another example, when a user started the game and need to carefully examine the content including both words and images of a disclosed panel, the user can select only one particular panel of interest to show and display the particular panel on the touch screen. In still another example, when a user needs information about where a specific story piece is placed with respect to the entire story, or the relationship between one specific story piece with another story piece, the user can choose to display the story piece of interest with other story pieces in a map view, wherein the map view does not have to be a grid view having rows and columns; the map view can have a variety of layout formats to show desired relationships. Relationship herein includes either a relationship in time or a relationship in logic. The relationship between the story panels may be visible or become visible at a user's preference. For example, as shown in FIG. 3, each cell is labeled with a number to indicate its relevant place in the overall story. Alternatively, the cells can be labeled with arrows going one way to another to indicate relative relationships. Further for complicated stories there may be different threads and the ones that share the same threads might be labeled with the same or similar indications that provide indirect clues for a user. The cells belonging to the same threads may be arranged either vertically or horizontally.

The overall layout of the cells for a story normally takes the form of a rectangular grid of uncovered and covered panels, because touch screen for personal computing devices today are all rectangular shaped. Sizes of the panels are mostly standard or customized in order for a user to see. Because the goal for the story telling method disclosed herein is to uncover all the panels, and it is a custom that users tend to read from left to right or top to bottom, therefore in one example, a cell on the top is uncovered to provide rich information for a user to guess the next scene. But the custom of placement of a beginning cell on top left should be construed as a limitation. In another example, the story panel at the beginning is covered, and a user tries to decipher the beginning of the story.

In one aspect of the present invention, a linear story is presented herein. The linear story has only one beginning and one end. The story pieces enclosed in the each panel is fixed and a user can not change the contents. At the beginning only a few panel are disclosed while the rest of the panels are covered. The user is invited to unveil the rest of the story through unique and individual guesses. The user can have a different discovery experience of the story every time. In one example, the discovery process begins with the beginning of the story. In another example, the discovery process begins with story pieces that having multiple branching pathways for the story. In still another example, the discovery process for a user can also begin with story pieces providing the most choices for guesses. In yet another example, preferably, the discovery process for a user can also begins with story pieces leading to the easiest guesses so that a user can guess more as the story evolves. In one example, the story is finished when all the panels have been uncovered. In another example, the story is finished when the user has reached the end story panel but some middle story pieces in the narrative left uncovered.

The story piece in each panel can be recorded in any media format, including words, graphics, images, voices and videos. In one embodiment of the present invention, the story piece in a panel includes images and words. In another embodiment, the story piece in a panel further includes sounds. In still another embodiment, the story piece in a panel further includes animations. In yet another embodiment, the story piece includes video clips.

Figure 4:
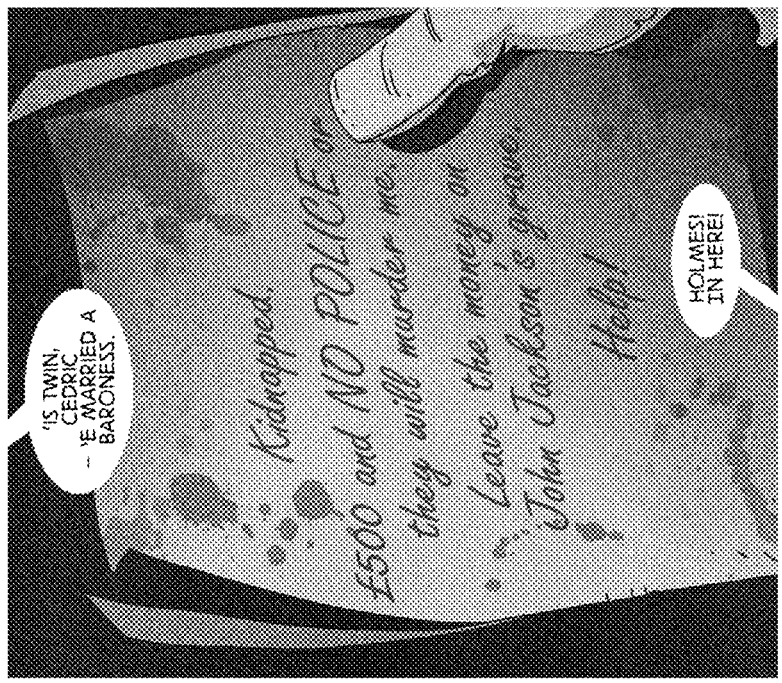
FIG. 4 is an illustration of an exemplary embodiment of the present invention, following FIG. 3, the user is invited to examine the panels that are uncovered.
Figure 4:
Figure 5:
FIG. 5 is an illustration of an exemplary embodiment of the present invention, following FIG. 4, the user can zoom in to one panel of FIG. 4 to review the images and words.
Figure 8:
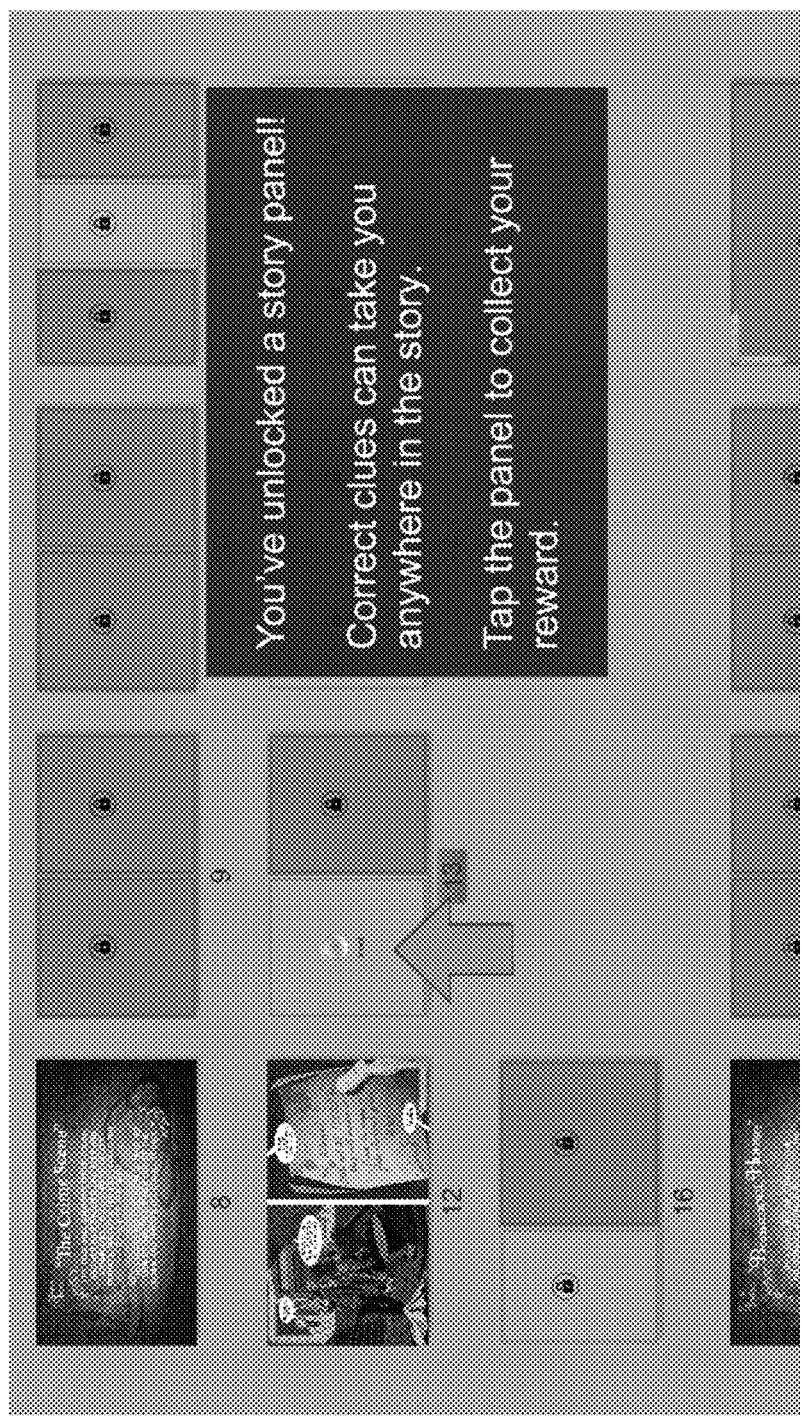
FIG. 8 is an illustration of an exemplary embodiment of the present invention, after the user's guess is correct, the user is invited to unlock a previously concealed panel.

For comparison purpose, FIG. 2 shows page 8 to page 15 of a graphic novel, laid out in a regular linear fashion from beginning to end. FIG. 3 shows page 8 to page 15 of the same story in the present invention, page 8 and page 12 being uncovered and pages 9-11 and 13-15 concealed from the user. Then the user is naturally attracted to the uncovered panels. By examining the panels individually, as shown in FIG. 4, the user begins to guess word choices that may uncover more of the story. The user can zoom into part of the story panel to have a closer review of the images and words as shown in FIG. 5. Then the user is invited to enter a guess through a touch screen. In one example, the steps from entering into the story (FIG. 3) to closely reviewing other contents of the uncovered panels (FIG. 5) are timed for different users or the same user if they enter games at different times. Based on the timing protocol, a prompt or request to enter a word guess is displayed at the touch screen. Upon the entry of the user's guess, one or more story panels are unlocked and ready to be uncovered as illustrated in FIG. 8.

Figure 6:
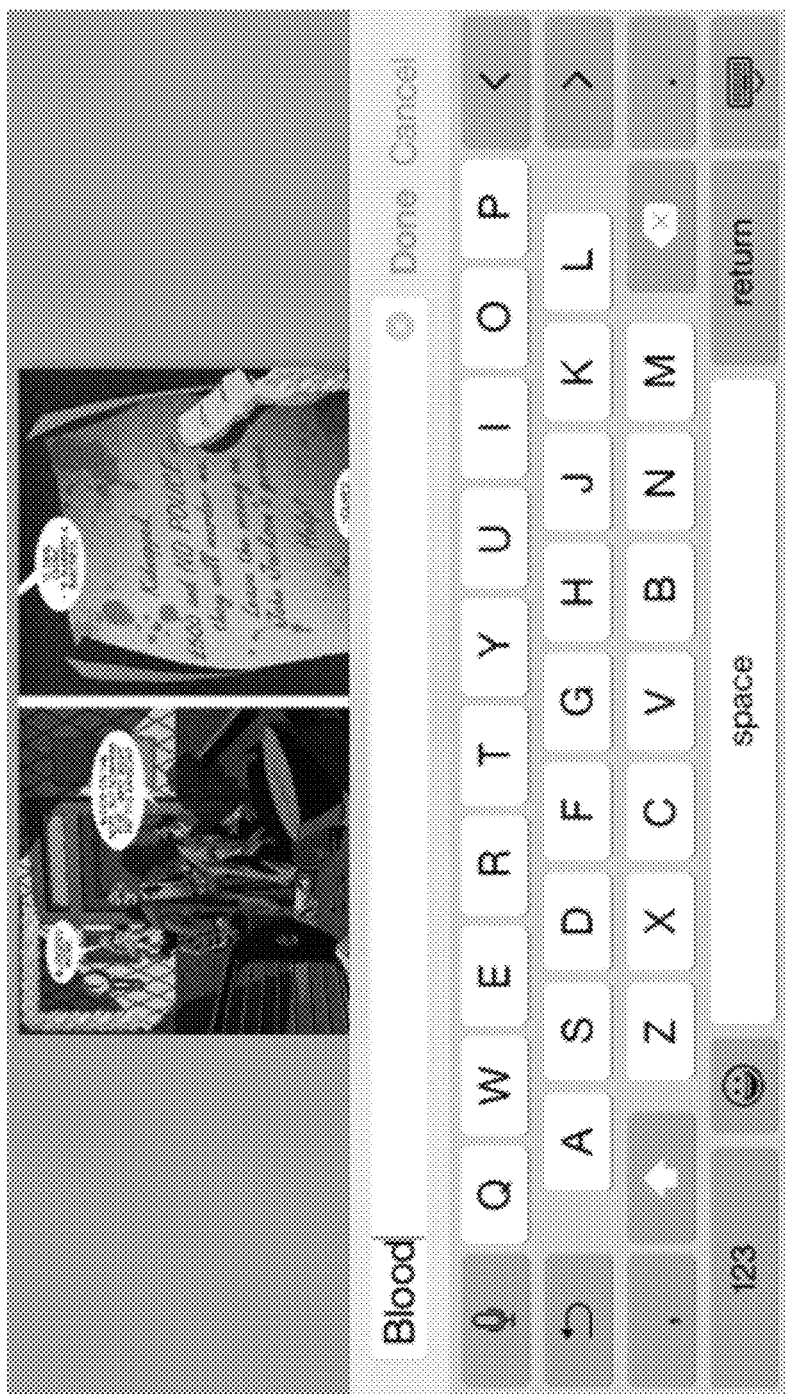
FIG. 6 is an illustration of an exemplary embodiment of the present invention, after FIG. 5 and/or FIG. 6, the user is prompted to enter a word guess through the user interface.
Figure 7:
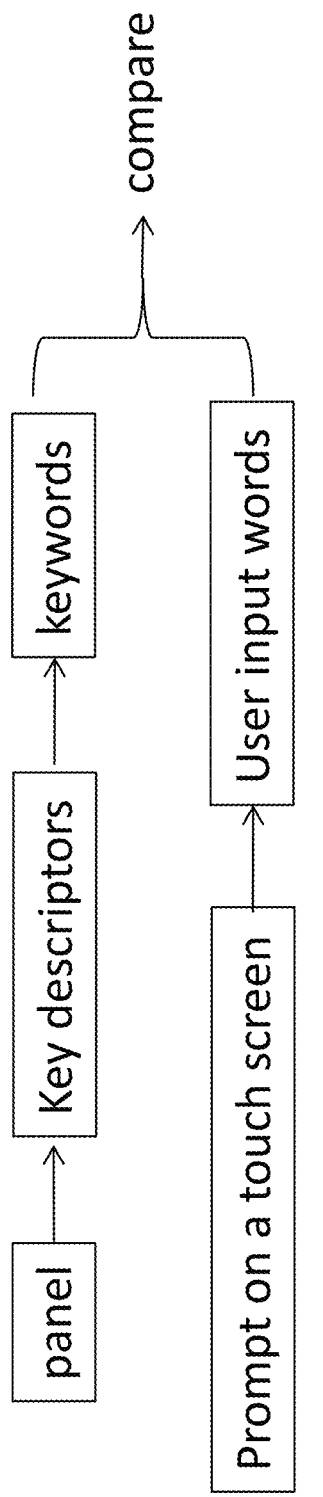
FIG. 7 is a schematic illustration of the comparing process in accordance with the aspects of the present invention.

Each story panel is made of a story piece represented by a combination of images and words, optionally sounds. From the content of each story piece a corresponding library of key descriptors is built. Based on the key descriptors a list of keywords is generated for each story panel. When a user enter a word on the touch screen, the user-entered word, for example "blood" in FIG. 6, is compared against a list of words that is stored in the computer executing program of the present invention. If a match is found, the corresponding story panel will be signaled to be unlocked.

In one example, one key word match only unlocks one story panel. In another example, one key word match unlocks multiple story panels. In a preferred example, one key word match unlocks 1-3 story panels. In a more preferred example, the computer executable program intelligently decides the number of the story panels to unlock based on the user level and the user's experience of the story.

Figure 9:
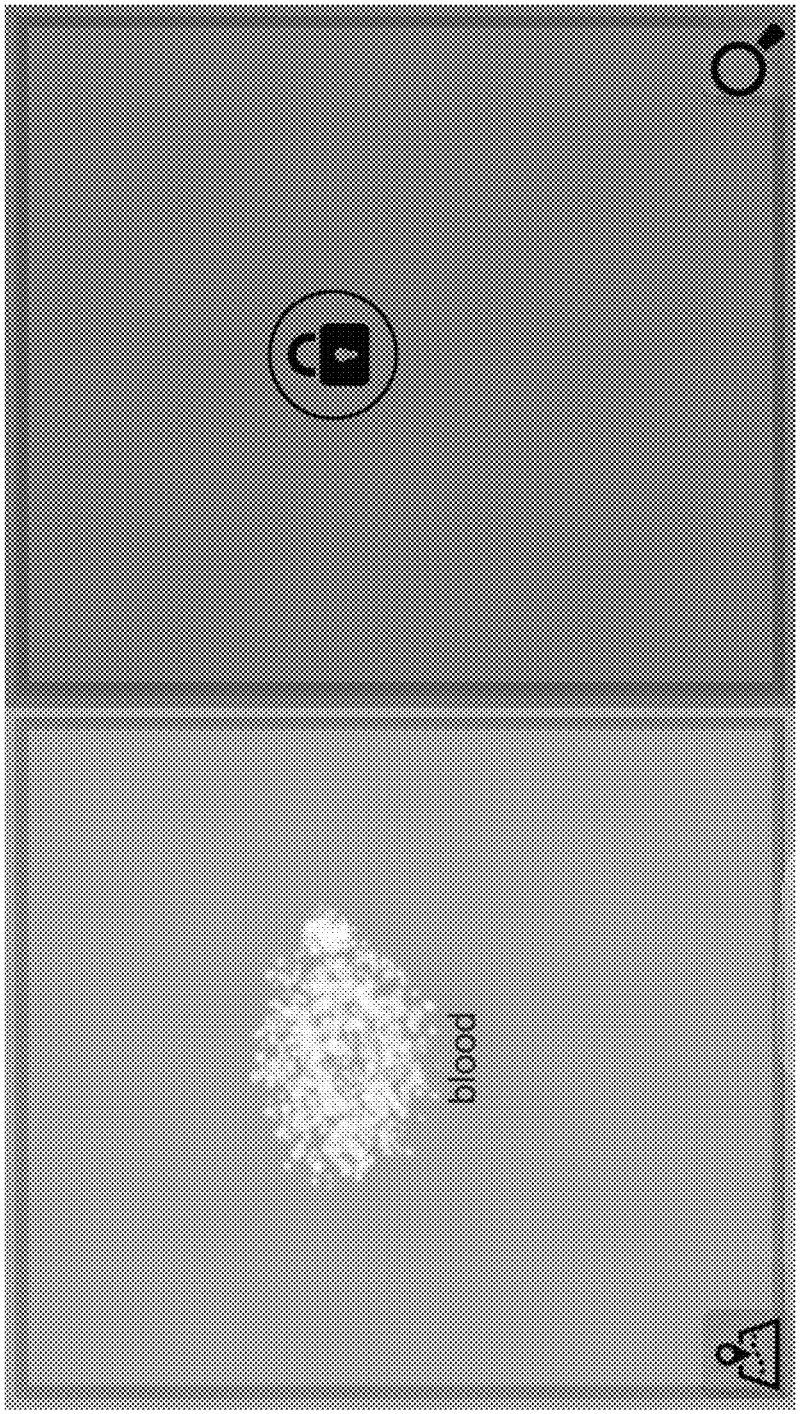
FIG. 9 shows an exemplar embodiment of the present invention when an animation effect is used to remove the cover and reveal the content of the unlocked panel.
Figure 10:
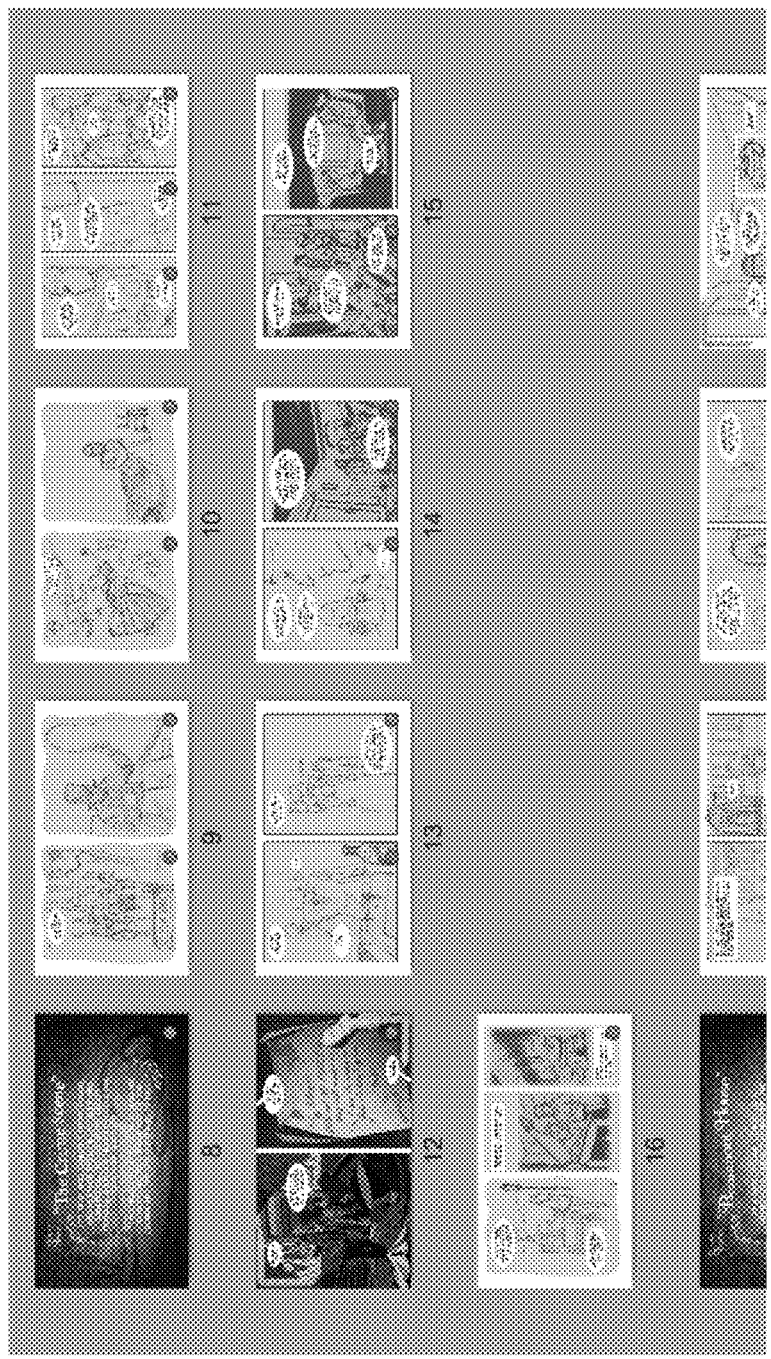
FIG. 10 shows an exemplar embodiment of the present invention, after FIG. 9, the user can choose to view the story pieces in a map view to review all the uncovered panels.

Referring to FIG. 9, in one embodiment of the present invention, advance animation features are implemented to enhance the dramatic effects of the story as an unlocked panel starts to be visible. In one example, as shown in FIG. 9, the computer executable program takes an initial position of the finger touch on the unlocked-and-ready-to-uncover panel, and gradually dissolves the cover. As the cover for the story panel starts to dissolve, the background color for the story panel changes from dark to light to clear. In one example, when a user has unlocked a story piece, the user is invited to tap on the cover of the story panel. Then the panel starts to dissolve out from the position where the users finger tapped and the cover of the story panel melts in an animated motion, transitioning into a final colored content.

In accordance with the aspects of the present invention, a user can change between a grid view or a map view, at anytime during the discovery process, a user can change between a grid view or a map view, and a view of an individual panel. After a user has uncovered a particular story panel, the user can review all the story panels that have already been uncovered, and determine a strategy to proceed.

Figure 11:
FIG. 11 illustrates an exemplar embodiment of the present invention, wherein a user can use a hint page for clues.
Figure 12:
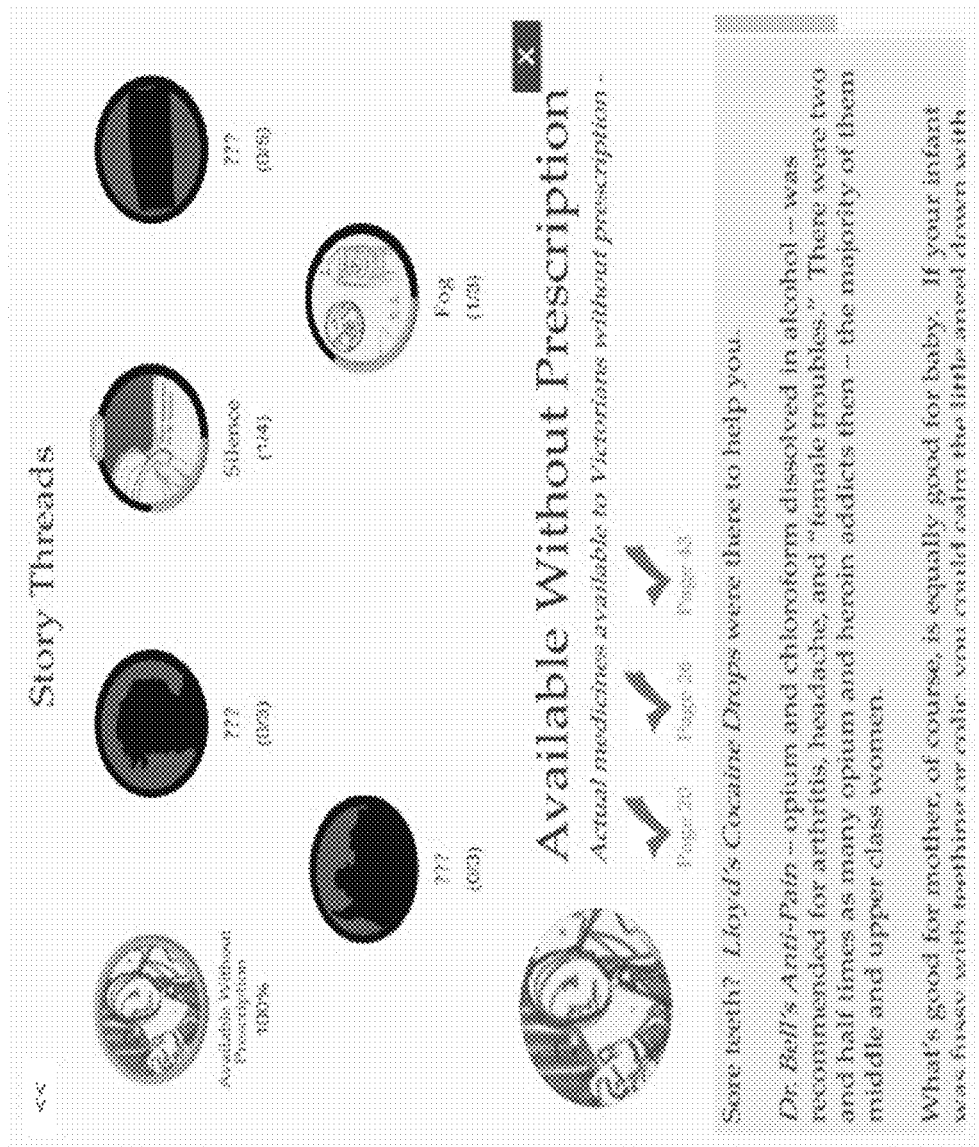
FIG. 12 illustrates an exemplar embodiment wherein a user can be rewarded by extra content in the form of story threads.
Figure 13:
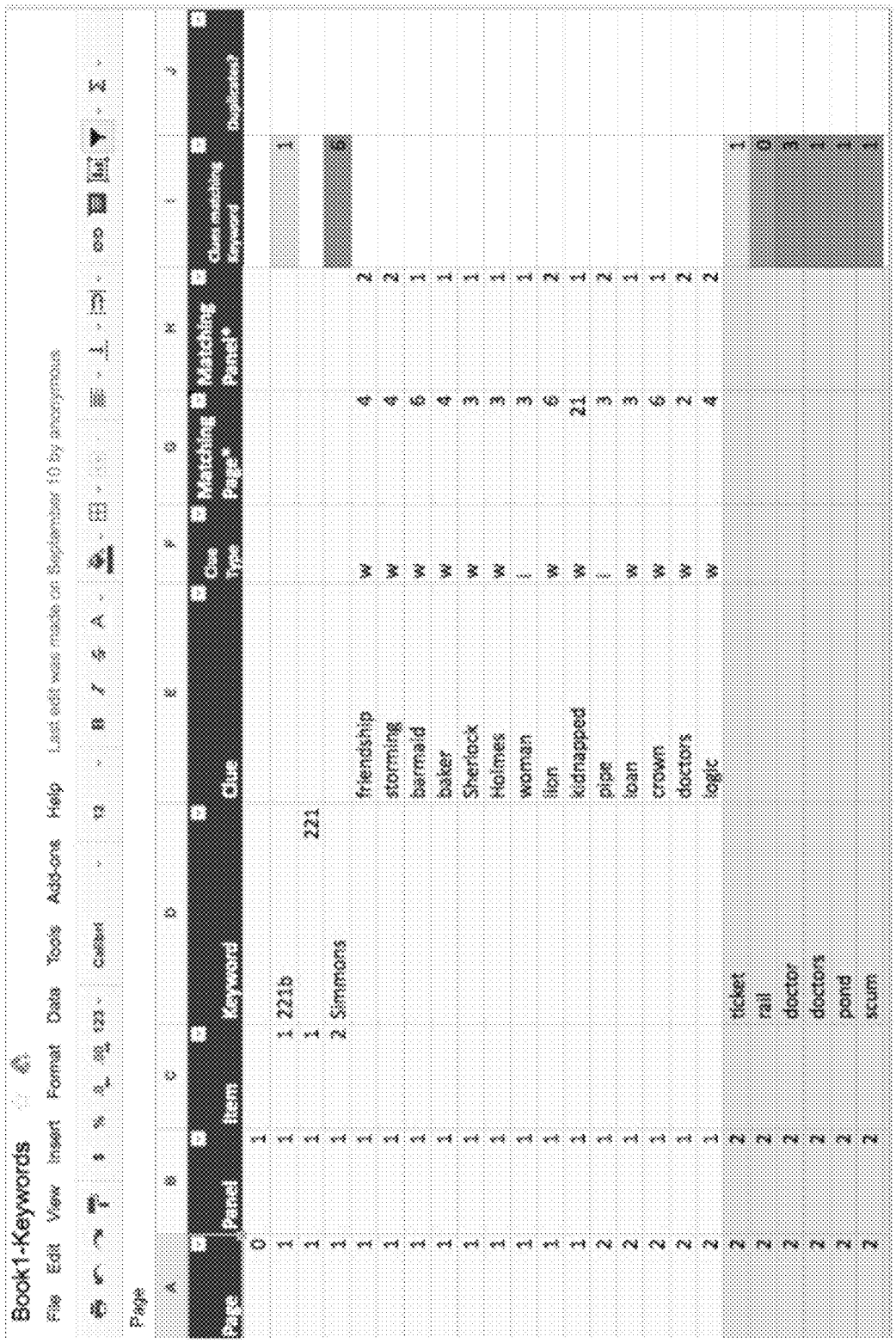
FIG. 13 illustrates keywords and clues are defined separately for each story piece and panel.

The method of the story telling of the present invention further provides hints to a user. A hint page can be selected by a user when he is stuck. The user can also select Hints when he wants to find a page that is rich in clues. A hint page can be displayed when a user taps on the hint icon as shown in FIG. 11 in the bottom right corner. Hints can also be shown automatically according to a timing protocol or other calculation algorithm implemented in the computer-executable program to enhance the interaction between the story and the user.

To further engage a user or to incentivize a user to uncover the story, a story threads page is included. Threads are a feature to reward the user with extra content. In one example, when a user unlocks five story panels in row, the user is rewarded. In another example, when a user enters a magic common keyword, 3 or 5 story panels are simultaneously unlocked, the user is rewarded. In another example, when a user unlocks three different panels that share a common theme, or along the same story branch that makes big progress in the narrative in the story branch, then the user is rewarded.

These rewards take the form of extra scenes from the story or background about the world and characters, not unlike the material in the "bonus features" on a film CD or found in the appendix of a book. As in those examples, this extra material is presented outside the context of the main linear narrative—although a clever player may find content in this bonus material that helps them guess clues to uncover more of the principal narrative.

The story telling method disclosed herein is directed to give a user maximum participation and control of the development of the story without changing the actual outcome of the story. The methods permits more than one users and can be used either online or off line. In addition, the computer executable program can intelligently track the progress of the user so as to become a companion for the user as the story progresses. That "companion" might be voiced as a neutral helping interface (like the navigation screens on a video game or Siri on your iPhone). It might also be voiced as a specific character (like Virgil leading Dante through Hell in the Inferno).

In one example of the present invention, the discovery process is started among multiple users, in which the users alternate guesses with one another, either cooperatively or competitively. In another example, the different users start the discovery process in parallel on line and share or compete in real time.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not meant to be exhaustive or to limit the embodiments to the precise forms disclosed. It will be apparent to one of ordinary skill in the art that many modifications and variations are possible in view of the above teachings.

Although the above refers to a touch screen as combination for display and inputting device. However, the non-touch sensitive screens can also serve as user interface devices, for example with keyboard and mouse.

The advantages of the embodiments described are numerous. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as coming within the scope of the invention.

I claim:

1. A method of making a story-based game with a play pattern based on a story narrative), comprising
   providing a linear story,
      which is configured to be revealed in a non-linear order by a user;
   dividing the linear story into multiple linked story pieces, wherein each story piece is placed in a cell and associating each cell with a library of key descriptors related to the contents of the story pieces, including a list of words and/or images;
   uncovering a first initial portion of the story pieces;
   covering a second initial portion of the story pieces;
   prompting the user to guess one word in order to uncover more of the linear story;
   revealing more of the story pieces after comparing the one word the user enters with the library of the key descriptors associated with each cell and a match is determined;
   wherein
      the user does not change the linear story nor the story pieces but reveals the story pieces in an individual sequence;
      the linear story has only one pre-authored beginning and one end.

2. The method of claim 1 further comprising displaying only one cell on a screen.

3. The method of claim 1 further comprising displaying all cells in rows or columns in a grid.

4. The method of claim 1, wherein the cells have different dimensions.

5. The method of claim 1, wherein the cells have same dimensions.

6. The method of claim 1, wherein at least one cell has only one panel.

7. The method of claim 1, wherein some cells have two or three panels, which are placed side by side without a space.

8. The method of claim 1, wherein the step of uncovering a first initial portion of the story pieces comprises uncovering a first panel in a cell but having a second panel covered in the same cell.

9. The method of claim 1, wherein the first initial portion of the story pieces that are initially uncovered are one or two panels.

10. The method of claim 1, wherein the first initial portion of the story pieces that are initially uncovered are less than 10% of the total cells.

11. The method of claim 1, wherein revealing more of the story pieces comprises uncovering a panel in a cell.

12. The method of claim 1, wherein placing visible marks in the panel to guide user's guesses.

13. The method of claim 1, wherein an icon is provided to direct a user to a hint library to help with the user's guess.

14. The method of claim 1, wherein uncovering a panel in a cell, including responding to a user's touch position and movement direction, comprises dissolving the cover of the panel from an initial finger touch position and spreading to the entire panel gradually, from invisible to visible.

15. A computer executable system to operate a story based game, comprising a linear story, wherein the content of the story is divided into multiple story pieces, among said multiple story pieces there is only one as the beginning piece and one as the end piece, and each story piece is associated with an individual key descriptor library;
   a touch sensitive user interface, wherein a user can input guesses in word format to navigate through the story pieces; and
   wherein a discovery sequence of the story pieces is determined by comparing and matching the input from the user and the key descriptor library of the different story pieces, wherein the key descriptors comprise words and/or images.

16. The system of claim 15, further comprises a hint system comprising clues to guide the user to guess and the hint system is created based on the key descriptor libraries.

17. The system of claim 16, further comprises story threads, where users can be rewarded for a series of guesses with bonus content that lies "outside" the main linear narrative.

18. Method of making a story-based game:
   providing a liner story;
   dividing the liner story into multiple linked story pieces;
   defining a first library of key descriptors for each story piece, wherein the first library of key descriptors are words leading into each story piece;

associating each story piece with the first library of key descriptors;

defining a second library of key descriptors for each story piece, wherein the second library of key descriptors are words arising out of each story piece;

associating each story piece with the second library of key descriptor;

establishing a relationship between the first library of key descriptors with the second library of key descriptors for each story piece; and allowing a user to uncover the linear story by comparing a user input with the second library and key descriptors and the relationship.

\* \* \* \* \*